United States Patent
Choi et al.

(10) Patent No.: US 9,230,020 B2
(45) Date of Patent: Jan. 5, 2016

(54) SEARCH METHOD, APPARATUS, AND SYSTEM FOR PROVIDING PREVIEW INFORMATION

(75) Inventors: Woo-hyuk Choi, Gyeonggi-do (KR); Dong-sung Kim, Gyeonggi-do (KR); Jin-hee Kim, Gyeonggi-do (KR); Nam-geol Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 36 days.

(21) Appl. No.: 12/880,556

(22) Filed: Sep. 13, 2010

(65) Prior Publication Data

US 2011/0066610 A1    Mar. 17, 2011

(30) Foreign Application Priority Data

Sep. 13, 2009 (KR) .................. 10-2009-0086203

(51) Int. Cl.
*G06F 17/30*    (2006.01)

(52) U.S. Cl.
CPC .... *G06F 17/30864* (2013.01); *G06F 17/30899* (2013.01)

(58) Field of Classification Search
CPC ............... G06F 17/30864; G06F 17/30554
USPC ................................................ 707/600–831
See application file for complete search history.

(56) References Cited

U.S. PATENT DOCUMENTS

| 7,707,198 | B2* | 4/2010 | Weber et al. ................ 707/705 |
| 2004/0205514 | A1 | 10/2004 | Sommerer et al. |
| 2005/0188057 | A1 | 8/2005 | Joo |
| 2006/0173859 | A1* | 8/2006 | Kim et al. ..................... 707/10 |
| 2007/0067268 | A1 | 3/2007 | Dai et al. |
| 2007/0074125 | A1 | 3/2007 | Platt et al. |
| 2007/0219954 | A1 | 9/2007 | Ray et al. |
| 2007/0226189 | A1 | 9/2007 | Piekos et al. |
| 2008/0140712 | A1* | 6/2008 | Weber et al. ............... 707/104.1 |
| 2008/0281794 | A1 | 11/2008 | Mathur |
| 2009/0125945 | A1 | 5/2009 | Lee et al. |
| 2009/0150353 | A1 | 6/2009 | Laakso et al. |
| 2009/0313220 | A1* | 12/2009 | Best et al. ......................... 707/3 |

FOREIGN PATENT DOCUMENTS

| CN | 101256596 | 9/2008 |
| CN | 101273347 | 9/2008 |
| CN | 101273348 | 9/2008 |
| CN | 101405688 | 4/2009 |
| JP | 2002-183152 | 6/2002 |
| JP | 2009-009381 | 1/2009 |

(Continued)

OTHER PUBLICATIONS

S. S. Manvi et al., Human Centered Multimedia Audio Data Retrieval in Computer Networks, May 4, 2019, IEEE, 26-30.*

(Continued)

*Primary Examiner* — Jean B Fleurantin
(74) *Attorney, Agent, or Firm* — The Farrell Law Firm, P.C.

(57) ABSTRACT

A search method, an apparatus, and a system for providing preview information are provided. The search method includes receiving a list of search result items and preview information from a server in real time and outputting the list and the preview information. Therefore, a search time can be efficiently reduced, which enables a user to obtain a desired search result more rapidly.

13 Claims, 9 Drawing Sheets

(56) References Cited

FOREIGN PATENT DOCUMENTS

| KR | 1020040011336 | 2/2004 |
|---|---|---|
| KR | 100785735 | 11/2007 |
| KR | 1020080077736 | 8/2008 |
| KR | 1020080111822 | 12/2008 |
| KR | 1020090083223 | 8/2009 |
| WO | WO 2007/037925 | 4/2007 |
| WO | WO 2007/038090 | 4/2007 |
| WO | WO 2007/106322 | 9/2007 |
| WO | WO 2008/144740 | 11/2008 |

OTHER PUBLICATIONS

Chinese Office Action dated Dec. 25, 2014 issued in counterpart application No. 201080040714.5.
Australian Examination Report dated Feb. 4, 2015 issued in counterpart application No. 2010293182.
Korean Office Action dated May 29, 2015 issued in counterpart application No. 10-2009-0086203.
Notice of Acceptance dated Jun. 5, 2015 issued in counterpart application No. 2010293182.
Russian Office Action dated Jun. 19, 2015 issued in counterpart application No. 2012114606/08.
European Search Report dated Oct. 8, 2014 issued in counterpart application No. 10815647.2-1507.
Japanese Office Action dated Oct. 21, 2014 issued in counterpart application No. 2012-528750.
Russian Office Action dated Oct. 17, 2014 issued in counterpart application No. 2012114606/08.
Australian Examination Report dated Oct. 21, 2014 issued in counterpart application No. 2010293182.

* cited by examiner

SEARCH METHOD, APPARATUS, AND SYSTEM FOR PROVIDING PREVIEW INFORMATION

PRIORITY

This application claims priority under 35 U.S.C. §119(a) to an application filed in the Korean Industrial Property Office on Sep. 13, 2009 and assigned Serial No. 2009-0086203, the content of which is incorporated herein by reference.

BACKGROUND OF THE INVENTION

1. Field of the Invention

The present invention relates generally to a search method, an apparatus, and a system for providing preview information, and more particularly, to a search method, an apparatus, and a system for providing preview information as search result in real time.

2. Description of Related Art

Recently, as use of multimedia apparatuses has become widespread, the quantity of content used in multimedia apparatuses has also increased exponentially. Due to the increase in content, a user may select and use diverse content.

However, due to the abundance of content, a user must perform precise and complicated searches in order to find desired content.

In particular, conventional automatic completion of a search provides only search result list, such that the user cannot identify each item in the search result list. Therefore, the user must click each item in the search result list in order to identify detailed content for each item.

Therefore, there is a need for a method for searching for desired content or data more easily and rapidly.

SUMMARY OF THE INVENTION

The present invention has been made to solve the above problems and to provide a search method, an apparatus, and a system for providing preview information in order for a user to approach desired search result more rapidly.

According to an aspect of the present invention, a search method is provided. The search method includes receiving a list of search result items satisfying a search condition and preview information of an item expected to be selected from the list of search result items from a server in real time; and outputting the list of search result items and the preview information.

The search method further includes if the search condition is input, transmitting the search condition to the server in real time, wherein in the receiving operation, the list of search result searched for by the server based on the search condition and the preview information are received from the server.

According to another aspect of the present invention, a search apparatus is provided. The search apparatus includes a transmission/reception unit for receiving a list of search result items satisfying a search condition and preview information of an item expected to be selected from the list of search result items from a server in real time; and a control unit for outputting the list of search result items and the preview information.

The search apparatus further includes an input unit which inputs the search condition, and if a plurality of search conditions are continuously input through the input unit, the transmission/reception unit receives a list of search result satisfying a combination of the plurality of search conditions and preview information of an item expected to be selected from the list of search result from the server in real time.

The search apparatus further includes an input unit which inputs the search condition, and if the search condition is input through the input unit, the transmission/reception unit transmits the search condition to the server in real time, and receives the list of search result searched for by the server based on the search condition and the preview information from the server.

According to yet another aspect of the present invention, a search system is provided. The search system includes a display apparatus for transmitting a search condition input by a user to a server, and receiving and outputting a search result from the server; and a server for searching based on the search condition, and transmitting a list of search result items satisfying the search condition and preview information of an item expected to be selected from the list of search result items to the display apparatus.

Consequently, a search time may be efficiently reduced, so the user can approach desired search result more rapidly.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE INVENTION

Hereinafter, preferred embodiments of the present invention will be described with reference to the accompanying drawings. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
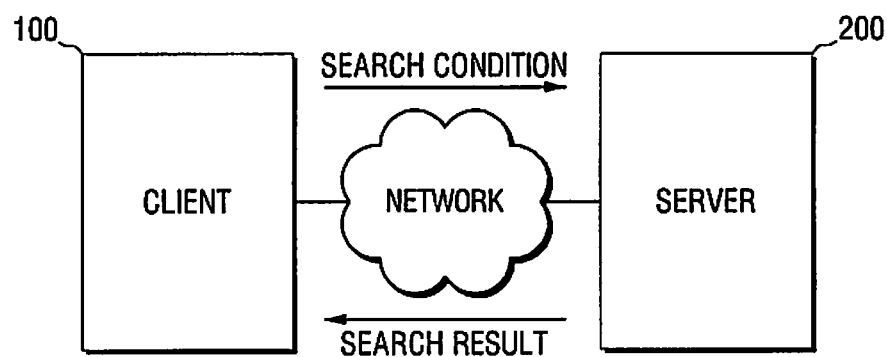
FIG. 1 is a block diagram illustrating a search system according to an embodiment of the present invention.

FIG. 1 is a block diagram illustrating a search system according to an embodiment of the present invention. The search system provides a client with content or data that is produced by a content provider and stored in a server through a network in real time.

As illustrated in FIG. 1, the search system according to an embodiment of the present invention may include a client 100 and a server 200.

The client 100 accesses the server 200 and receives content or data from the server 200 through the network, which enables a user to use the content or data.

If the client 100 transmits a search condition such as a search term input by the user to the server 200, the server 200 searches for content or data corresponding to the search condition.

The server 200 searches for content or data stored therein according to the search condition received from the client 100. In particular, the server 200 searches for content or data according to the search condition received from the client 100 in real time, and transmits the search result to the client 100 in real time. If search conditions are input continuously, the search conditions are combined and searched, and a search result based on the combined search condition is transmitted to the client 100 in real time.

The searched items stored in the server 200 are contents produced by a content provider or data generated by a content provider. The content provider may produce content or generate data, as well as transmit the content or data to the server 200 for storage.

The client 100 may request preview information for one item from among the received search result. The server 200 may transmit the requested preview information to the client 100.

Hereinafter, the process for transmitting preview information from the server 20 to the client 100 is described with reference to FIGS. 2 and 3.

Figure 2:
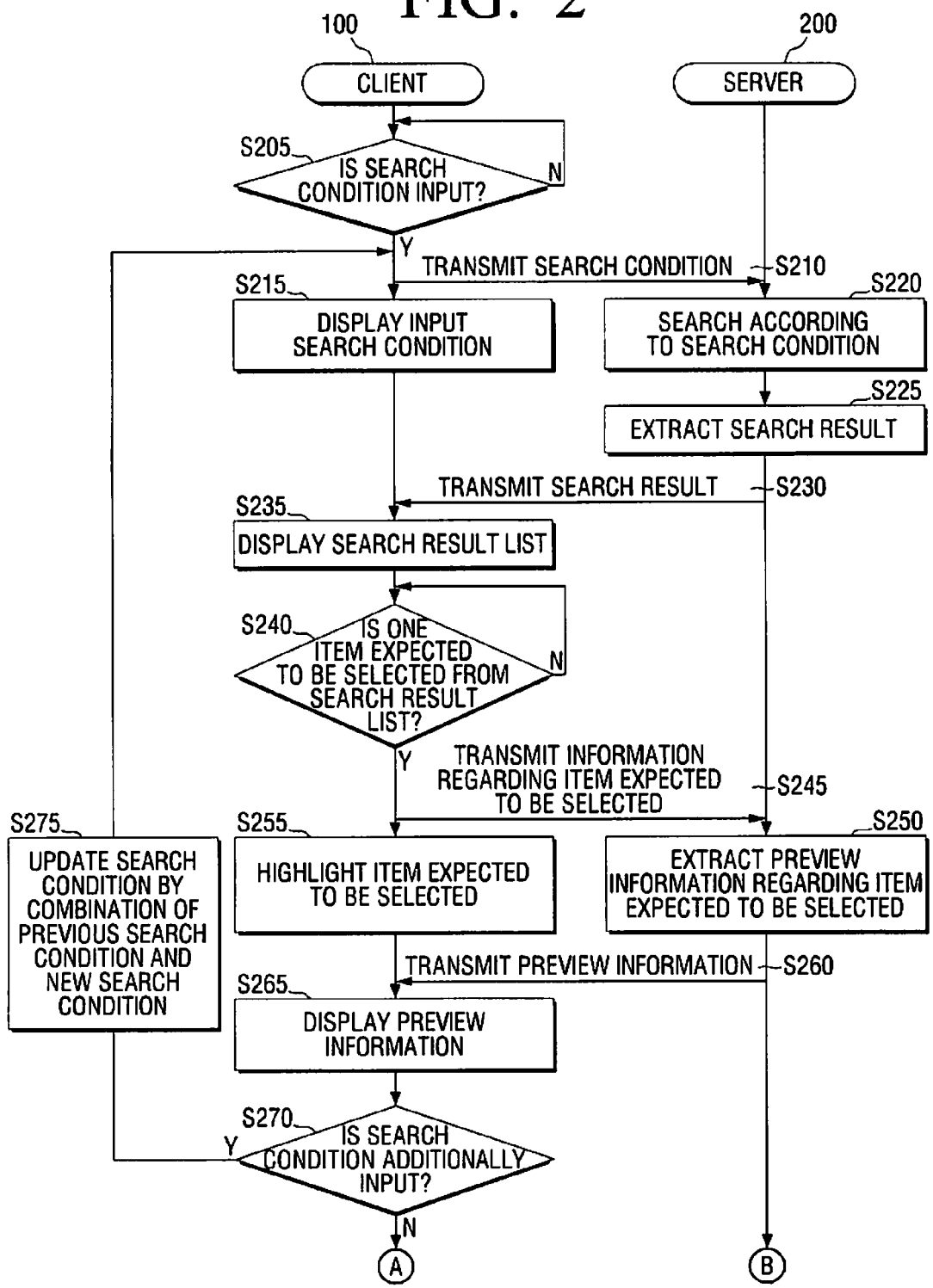
FIGS. 2 and 3 are flowcharts illustrating a search method according to an embodiment of the present invention.
Figure 3:
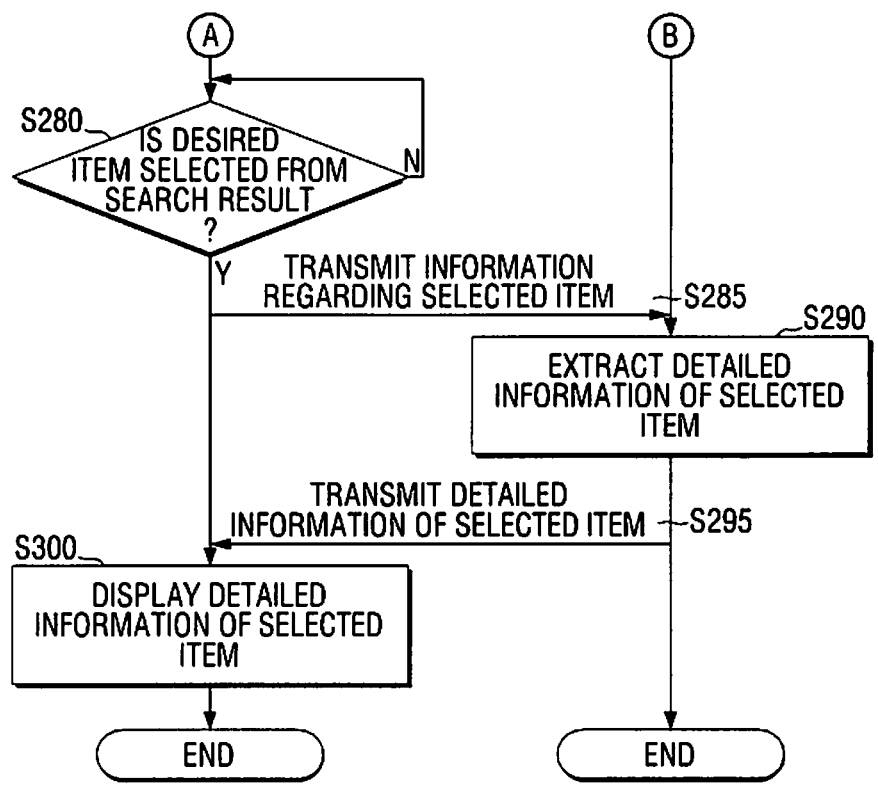

FIGS. 2 and 3 are flowcharts illustrating a search method according to an embodiment of the present invention.

If the user inputs a search condition to the client 100, in step S205-Y, the client 100 transmits the input search condition to the server 200, in step S210. When the search condition is input and transmitted, the client 100 displays the input search condition on a screen, in step S215, so that the user may identify which search condition is input.

The server 200 searches for content or data stored therein according to the input search condition, in step S220, extracts a search result that matches the search condition, in step S225, and transmits the search result to the client 100, in step S230.

The client 100 displays a list of the received search result items on the screen, in step S235, and determines whether an expected item to be selected from the search result list in step S240.

"An expected item to be selected" from the search result list refers to an indication of a specific item has not been selected from the search result list yet, just prior to selection one of the specific item from the search result list. For example, in order to select one item from the search result list, the user may click the item from the search result list using an input means such as a mouse or may position a cursor on the item from the search result list using an input means such as a keyboard and press an enter key, i.e., the clicking or pressing the enter key indicates selecting the item from the search result list.

However, an expectation of an item to be selected from the search result list is indicated prior to the clicking or pressing the enter key. More specifically, an item expected to be selected can be indicated by, for example, positioning an arrow on the item from the search result list using an input means such as a mouse, or positioning a cursor on the item from the search result list using an input means such as a keyboard, before the item itself is actually selected by clicking on the item, for example.

If the user indicates an expected item to be selected from the search result list, the client 100 transmits information for the expected item to the server 200, in step S245, and highlights the expected item, in step S255.

If the server 200 receives the information for the indicated item from the client 100, in step S250, the server 200 extracts preview information of the indicated item, S250 and transmits the preview information to the client 100, in step S260. The preview information indicates core information regarding the expected item and distinct from other items. In particular, the preview information may be an image or sound related to the expected item.

The client 100 receives the preview information, displays the preview information on the screen, in step S265, and determines whether the user inputs an additional search condition, in step S270. If the client 100 determines that the user inputs an additional search condition, the client 100 updates the search condition by combining the previous search condition and the new search condition, and repeats steps S210 to S270 according to the updated combined search condition, in step S275.

Updating the search condition is performed as follows. For example, if the user inputs search letter 'A' as a search condition, the client 100 and the server 200 extracts search result through steps S210 to S270 or provides preview information regarding search letter 'A' Subsequently, if the user inputs search letter 'B' as a new search condition, the client 100 and the server 200 extracts search result for search letters 'AB' which is a combination of 'A' and 'B' through operations S210 to S270 or provides preview information for search letters 'AB'.

If the client 100 determines that an additional search condition is not input, in step S270, the client 100 and the server 200 proceed to operations as shown in FIG. 3. Subsequently, the client 100 determines whether a desired item is selected from the search result, in step S280, and if a desired item is selected from the search result, the client 100 transmits information for the selected item to the server 200, in step S285.

The server 200 extracts detailed information for the selected item, in step S290 and transmits the extracted detailed information to the client 100. The client 100 displays the detailed information on the screen, in step S300.

As described above, the preview information of the item expected to be selected from the search result by the user is provided before providing the detailed information for the item upon selection by the user, thereby efficiently reducing a search time in order for the user to reach a desired search result more rapidly.

Hereinafter, methods for displaying preview information on the screen of the client 100 are described with reference to FIGS. 4 to 8.

Figure 4:
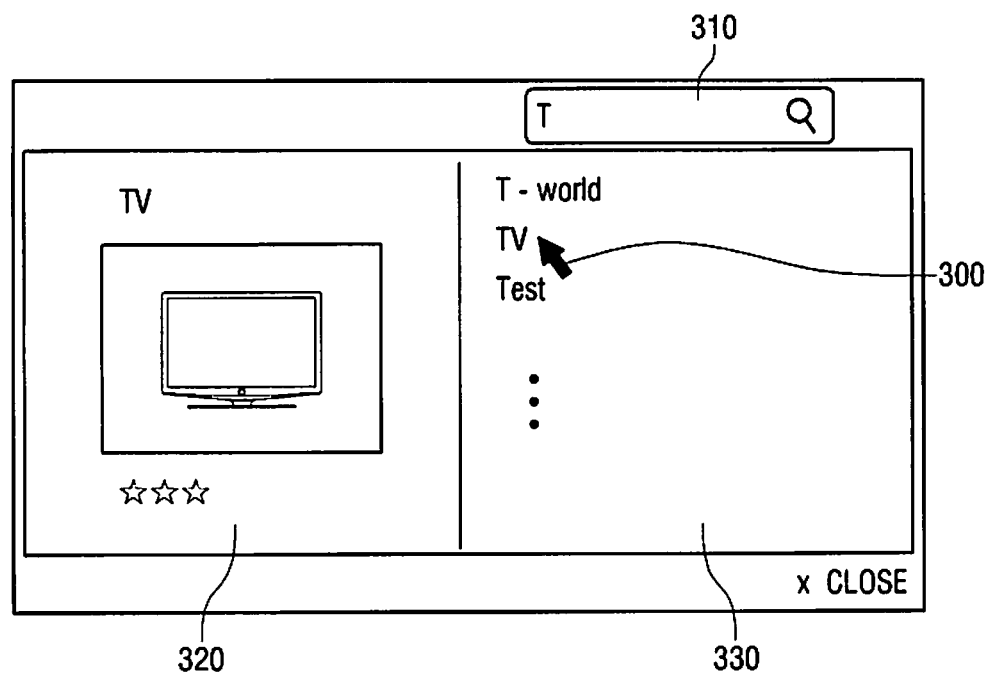
FIG. 4 illustrates a method for displaying preview information according to an embodiment of the present invention.

FIG. 4 illustrates a method for displaying preview information according to an embodiment of the present invention. The screen of the client 100 is divided into three areas 310 to 330.

The first area 310 displays a search condition input by the user. As described above, if the user inputs a search condition, the search condition is transmitted to the server 200 and displayed on the screen of the client 100 so that the user may identify the search condition that is input. The first area 310 shows that the user inputs search condition 'T'.

The second area 330 displays a search result matching the search condition input by the user. As described above, if the user inputs a search condition, the search condition is transmitted to the server 200, and the server 200 extracts a search result matching the search condition and transmits the search result to the client 100. Accordingly, the client 100 displays the search result on the second area 330, in order for the user to identify the search result. The second area 330 shows that 'T-world', 'TV', 'Test', etc. are output as the search result.

The third area 320 displays preview information of an item expected to be selected from search result matching search condition. As described above, if the search result is displayed on the second area 330, the user may expect one item to be selected from the search result using an input device such as a mouse or a keyboard.

According to this embodiment of the present invention, expecting one item to be selected is performed using a mouse. Accordingly, as illustrated in FIG. 4, operation of the mouse by the user is displayed using an arrow 300 on the screen, and the user may expect a desired item to be selected from the search result by moving the arrow 300 using the mouse. That is, in FIG. 4, 'TV' is expected to be selected but 'T-world' or 'Test' may be expected to be selected using the mouse.

If an item is expected to be selected by the client 100, information regarding the item expected to be selected is transmitted to the server 200 and the server 200 transmits preview information of the item expected to be selected to the client 100. Accordingly, the client 100 displays the preview information on the third area 320, so the user may more readily identify content of the item expected to be selected. The third area 320 shows the title 'TV', a thumbnail image, and rating of the item expected to be selected.

Figure 5:
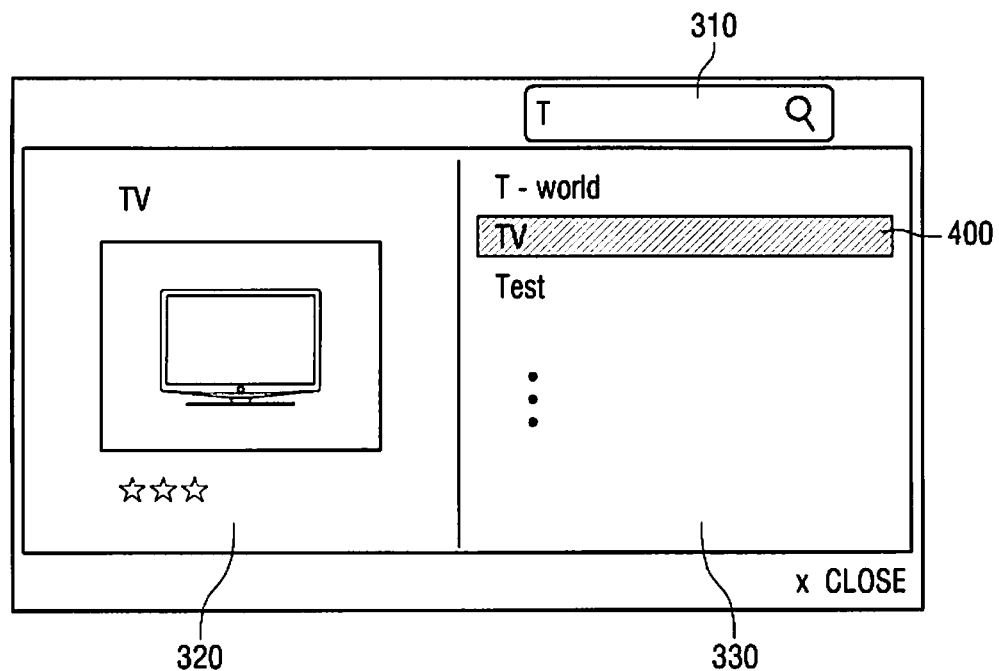
FIG. 5 illustrates a method for displaying preview information according to another embodiment of the present invention.

FIG. 5 illustrates a method for displaying preview information according to another embodiment of the present invention. The method described with reference to FIG. 5 is similar to the embodiment described with reference to FIG. 4. However, according to the present example, an expected one item to be selected is indicated according a keyboard operation. Accordingly, as illustrated in FIG. 5, operation of the keyboard is displayed using a highlight 400 on the screen, and the user may expect a desired item to be selected from the search result by moving the highlight 400 using direction keys. That is, in FIG. 5, 'TV' is expected to be selected but 'T-world' or 'Test' may be expected to be selected using direction keys.

Figure 6:
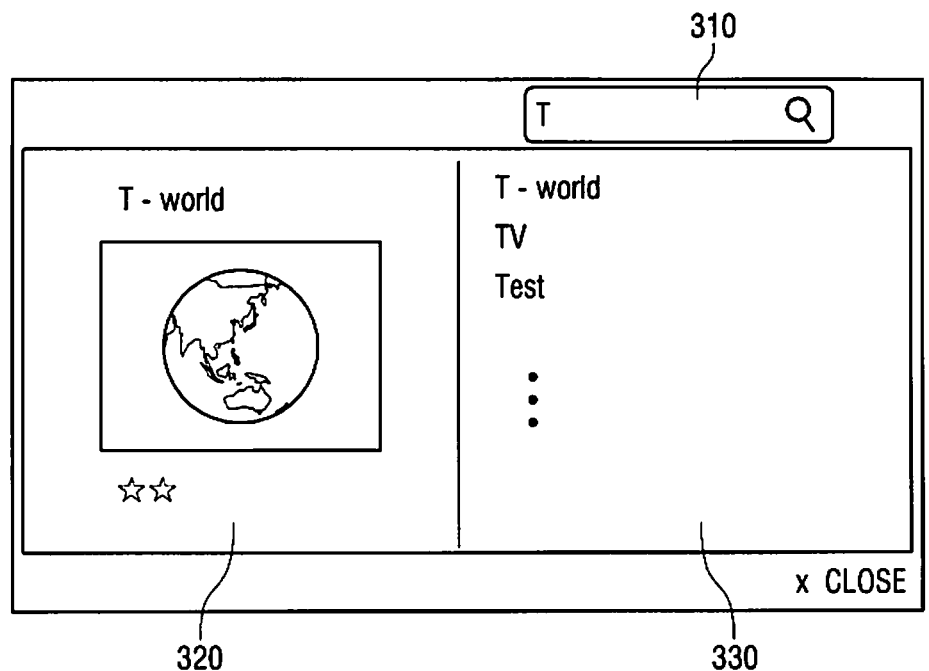
FIG. 6 illustrates a method for displaying preview information according to yet another embodiment of the present invention.

FIG. 6 illustrates a method for displaying preview information according to yet another embodiment of the present invention. The method described with reference to FIG. 6 includes displaying preview information without user-operations, in contrast to the embodiments described with reference to FIGS. 4 and 5.

If a search condition is input in the client 100, the server 200 searches according to the search condition. The server 200 arranges items within the search result in the order for satisfying the search condition and transmits the arranged search result to the client 100. Therefore, 'T-world', 'TV', and 'Test' satisfy the search condition 'T' input by the user in sequence.

Since 'T-world' satisfies the search condition the more closely than the other items, there is a higher possibility that the user intends to search for 'T-world'. Accordingly, the client 100 may request preview information of an item positioned on the top of the search result without receiving a separate user input to indicate an expected item to be selected. Alternatively, the server 200 may preview information of an item satisfying the search condition the most along with the search result without the client 100's separate request for the preview information.

Consequently, the client 100 displays the preview information received from the server 200 on the third area 320 of the screen, so the user may more readily identify the content corresponding to the item that most closely matches the search condition. The third area 320 of FIG. 6 shows the title 'T-world', a thumbnail image, and rating of the item satisfying the search condition the most.

Figure 7:
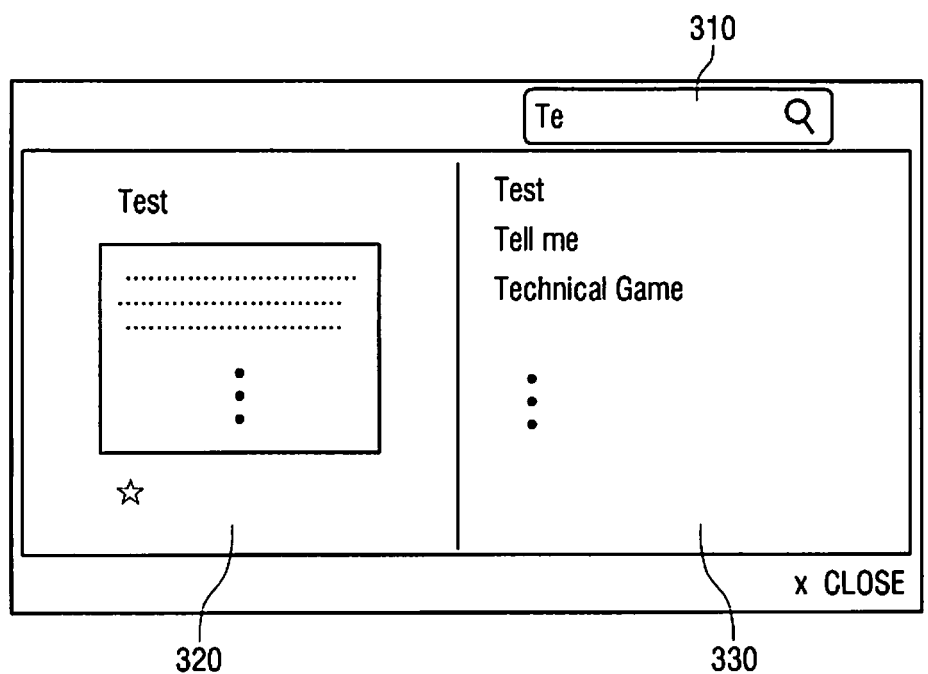
FIG. 7 illustrates a method for displaying preview information when a search condition is additionally input.

FIG. 7 illustrates a method according to another embodiment of the present invention for displaying preview information when a search condition is additionally input.

If the user initially inputs search condition 'T' first and subsequently inputs search condition 'e', the first area 310 combines and displays the firstly input search condition and the additionally input search condition. Accordingly, the user may know which search conditions have been input.

When the user additionally inputs the character 'e', the 'e' is transmitted to the server 200, the server 200 searches for content or data matching 'Te' which is generated by combining 'T' and 'e'.

Subsequently, the server 200 extracts search result matching 'Te' and transmits the search result to the client 100. The client 100 displays the search result on the second area 330, so the user may identify the search result. The second area 330 of FIG. 7 shows that 'Test', 'Tell me', 'Technical Game', etc. are searched for by the server 200 based on the search condition 'Te'.

If the user expects 'Test' to be selected, the client 100 may request preview information of 'Test' and display the preview information of 'Test' on the third area 320 as shown in FIG. 7. As described above, although the user does not expect 'Test' to be selected, if it is determined that 'Test' satisfies the search condition more than the other items, the server 200 may transmit the preview information of 'Test' to the client 100.

Figure 8:
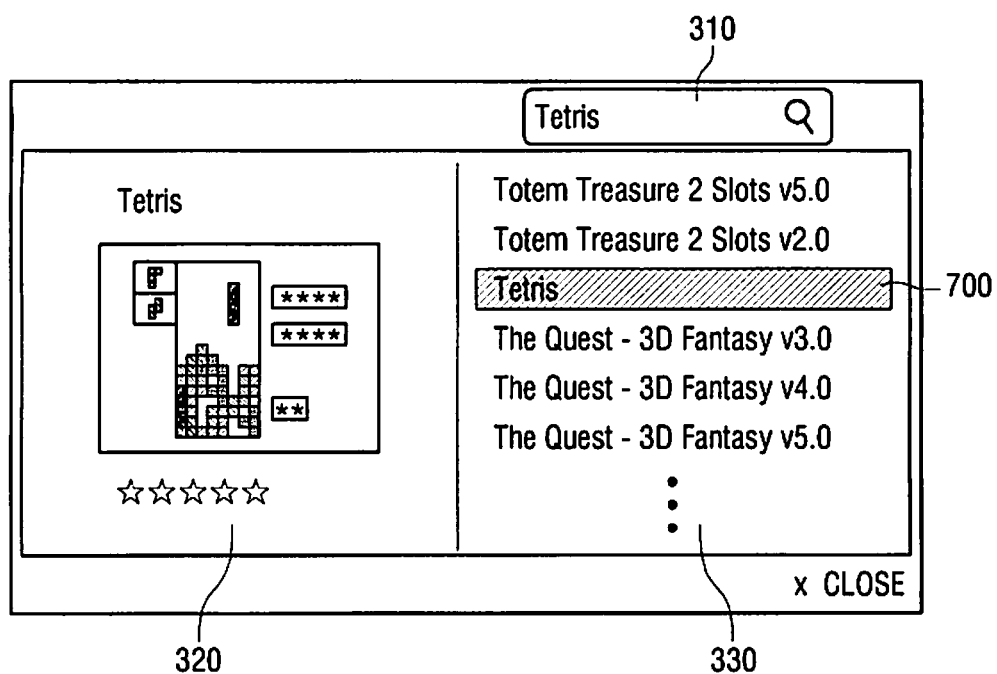
FIG. 8 illustrates a method for displaying preview information when all search conditions are input.

FIG. 8 illustrates a method for displaying preview information when all search conditions are input according to another embodiment of the present invention.

If the user inputs search conditions, for example, 'Tetris', the search conditions are transmitted to the server 200 and the server 200 transmits search result for the search conditions 'Tetris' to the client 100.

More specifically, if search condition 'T' is input, a search result for 'T' is transmitted from the server 200 to the client 100. If search condition 'e' is subsequently input, search result for 'Te' is transmitted from the server 200 to the client 100. If search condition 't' is subsequently input, search result for 'Tet' is transmitted from the server 200 to the client 100. If search condition 'r' is subsequently input, search result for 'Tetr' is transmitted from the server 200 to the client 100. If search condition 'i' is subsequently input, search result for 'Tetri' is transmitted from the server 200 to the client 100. If search condition 's' is subsequently input, search result for 'Tetris' is transmitted from the server 200 to the client 100.

If the user completes input of search conditions, the server 200 transmits a search result matching the search conditions to the client 100 and also transmits preview information of an item perfectly matching the search conditions to the client 100.

Accordingly, the title 'Tetris' thumbnail image, and rating are displayed on the third area 320 as the preview information of the item perfectly matching the search conditions.

In addition, the item perfectly matching the search conditions is highlighted and displayed on the second area 330. The highlight 700 may be provided by the client 100 itself or by the server 200, in contrast to the highlight 400 shown in FIG. 5. In other words, a determination of whether an item matches with the search conditions may be performed by the client 100 or the server 200, and the client 100 or the server 200 may highlight the item perfectly matching the search conditions based on the determination. Accordingly, the highlight 400 shown in FIG. 5 is generated according to the user operating direction keys, and thus the highlight 400 is distinct from the highlight 700 shown in FIG. 8. Therefore, the highlight 400 shown in FIG. 5 and the highlight 700 shown in FIG. 8 may be expressed in different methods.

Figure 9:
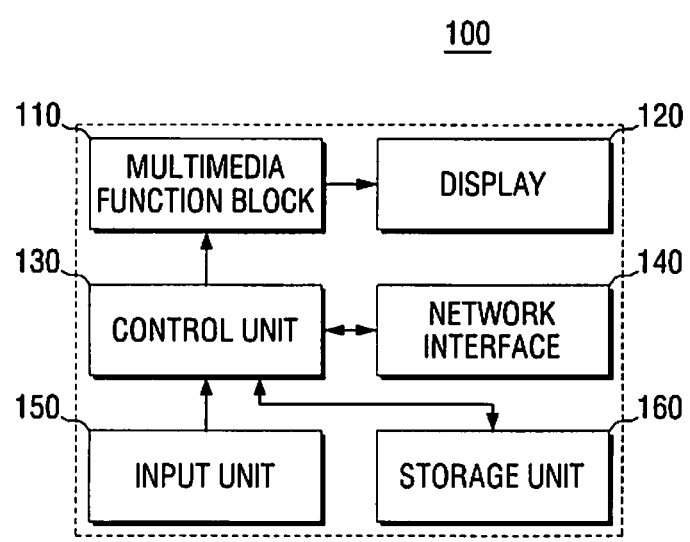
FIG. 9 is a block diagram illustrating a configuration of a client.

FIG. 9 is a block diagram illustrating a configuration of the client 100 according to an embodiment of the present invention. In FIG. 9, only components that are necessary for description of the present invention are schematically illustrated.

The client 100 may include a multimedia function block 110, a display 120, a control unit 130, a network interface 140, an input unit 150, and a storage unit 160.

The multimedia function block 110 performs image-processing of preview information or detailed information received from the server 200 to be displayed on the screen.

The display 120 displays a search condition, a search result and preview information on the screen. In particular, the first area 310 of the display 120 shows a search condition input by the user, the second area 330 of the display 120 shows search result searched for by the server 200, and the third area 320 of the display 120 shows preview information for an item expected to be selected or detailed information for a selected item, so the user may identify the information.

The network interface 140 is a path that enables the client 100 to communicate with the server 200 through the network. The client 100 transmits a search condition and request for preview information to the server 200 and receives search result and preview information from the server 200 through the network interface 140.

The input unit 150 is connected to the mouse or the keyboard to receive input of the user's operation as described above. In particular, the input unit 150 receives input indicating an expected item to be selected from a search result by the user, and transmits the user's input to the control unit 130.

The storage unit 160 stores a program to operate the client 100, and diverse information, data and search result received from the server 200. The storage unit 160 may be implemented as hard disk, non-volatile memory, or the like.

The control unit 130 controls the overall operation of the client 100 to transmit a search condition to the server 200, display search result, and request, receive and display preview information.

Therefore, a search time can be efficiently reduced, so the user can approach desired search result more rapidly.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A search method performed in an electronic device having a network interface, comprising:
   communicating with a server through the network interface;
   receiving, by an input unit, a plurality of search conditions comprising a plurality of user character inputs sequentially;
   receiving a list of search result items from the server in real time based upon a combination of the plurality of the search conditions;
   outputting the list of search result items on a display;
   receiving, when an item is expected to be selected from among the other items in the list of search result items, preview information regarding the item through the network interface, the preview information including, core information, which includes at least one of an image and sound, regarding the item distinct from the received information regarding the other items in the list of search results; and
   previewing the received preview information regarding the item while outputting the list of search result items received from the server in real time,
   wherein, in receiving the plurality of search conditions comprising the plurality of user character inputs, if the plurality of search conditions are continuously input, the list of search result items satisfying the combination of the plurality of search conditions and the preview information regarding the item are received from the server in real time, and
   wherein the list of search result items is newly received and output whenever a new user character input is received.

2. The search method according to claim 1, wherein the item expected is an item that is pointed to by a cursor moving according to a user's operation in the list of search result items, but has not been selected by the user.

3. The search method according to claim 1, wherein the item is an item that is determined, by the server, as most satisfying of the search condition from among the list of search result items, and
   wherein the item is displayed differently from remaining items or is positioned at a top of the list of search result items.

4. The search method according to claim 1, wherein the preview information includes an image or sound related to the search result.

5. The search method according to claim 1, wherein in outputting the list of search result items, the list of search result items and the preview information are output on a screen of the display, and the screen is divided into a first area for receiving input of the search condition, a second area for displaying the list of search result items, and a third area for displaying the preview information.

6. The search method according to claim 1, further comprising:
   transmitting the plurality of the search conditions to the server in real time,
   wherein the list of search result items searched for by the server based on the plurality of search conditions and the preview information are received from the server.

7. A search apparatus of an electronic device having a network interface, the search apparatus comprising:
   an input unit for receiving input of a search condition;
   a transmission/reception unit for communicating with a server through the network interface, receiving a plurality of the search conditions comprising a plurality of user character inputs sequentially, transmitting the search condition to the server in real time, receiving a list of search result items from the server in real time based upon a combination of the plurality of the search conditions, and receiving, when an item is expected to be selected from among the other items in the list of search result items, preview information regarding the item through the network interface, the preview information including, core information, which includes at least one of an image and sound, regarding the item distinct from the received information regarding the other items in the list of search results; and
   a control unit for outputting the list of search result items on a display and previewing the received information regarding the item while outputting the list of search result items received from the server in real time,
   wherein if the plurality of search conditions are continuously input through the input unit, the transmission/reception unit receives the list of search result items satisfying the combination of the plurality of search conditions and the preview information regarding the item from the server in real time, and
   wherein the list of search result items is newly received and output whenever a new user character input is received.

8. The search apparatus according to claim 7, wherein the item is an item that is pointed to by a cursor moving according to a user's operation in the list of search result items, but has not been selected by the user.

9. The search apparatus according to claim 7, wherein the item is an item that is determined, by the server, to most satisfy the search condition inform among the list of search result items, and
wherein the item is displayed differently from the remaining items or is positioned at a top of the list of search result items.

10. The search apparatus according to claim 7, wherein the preview information includes an image or sound related to the search result.

11. The search apparatus according to claim 7, wherein the control unit outputs the list of search result items and the preview information on a screen of the display, and
wherein the screen is divided into a first area for inputting the search condition, a second area for displaying the list of search result items, and a third area for displaying the preview information.

12. The search apparatus according to claim 7, wherein the transmission/reception unit transmits the plurality of search conditions to the server in real time, and receives the list of search result items searched for by the server based on the plurality of search conditions and the preview information from the server.

13. A search system, comprising:
a display apparatus for communicating with a server through a network interface, receiving a plurality of search conditions comprising a plurality of user character inputs sequentially, receiving a list of search result items from one or more processors of the server in real time based upon a combination of the plurality of the search conditions, outputting the list of search result items on a display, receiving, when an item is expected to be selected from among other items in the list of search result items, preview information regarding the item through the network interface, the preview information including, core information, which includes at least one of an image and sound, regarding the item distinct from the received information regarding the other items in the list of search results; and
previewing the received preview information regarding the item while outputting the list of search result items received from the server in real time; and
the server for searching based on a search condition corresponding to the plurality of user character inputs, and transmitting the list of search result items satisfying the search condition and the preview information regarding the item to the display apparatus,
wherein in receiving the plurality of search conditions comprising the plurality of user character inputs, if the plurality of search conditions are continuously input, the list of search result items satisfying the combination of the plurality of search conditions and the preview information regarding the item are received from the server in real time, and
wherein, in receiving the preview information, the list of search result items searched for by the server based on the search condition and the preview information are received from the server.

* * * * *